United States Patent [19]

Shionoya et al.

[11] Patent Number: 5,389,783
[45] Date of Patent: Feb. 14, 1995

[54] CONFOCAL LASER SCANNING MICROSCOPE WITH DUAL MODE WAVEGUIDE

[75] Inventors: Takashi Shionoya, Tokyo; Jun Iwasaki; Hiroshi Ohki, both of Yokohama, all of Japan

[73] Assignee: Nikon Corporation, Tokyo, Japan

[21] Appl. No.: 73,712

[22] Filed: Jun. 9, 1993

[30] Foreign Application Priority Data

Jun. 18, 1992 [JP] Japan .................. 4-159722

[51] Int. Cl.$^6$ ............................... H01J 3/14
[52] U.S. Cl. ................... 250/234; 356/368
[58] Field of Search ............ 250/216, 234, 235, 236, 250/458.1; 359/368

[56] References Cited

U.S. PATENT DOCUMENTS

| | | | |
|---|---|---|---|
| 5,122,653 | 6/1992 | Ohki | 250/216 |
| 5,132,526 | 7/1992 | Iwasaki | 250/234 |

FOREIGN PATENT DOCUMENTS

0489580 6/1992 European Pat. Off. .
4-208913 7/1992 Japan .

OTHER PUBLICATIONS

Ooki, H., et al., "A Novel Type of Laser Scanning Microscope: Theoretical Considerations", *Optics Communications*, vol. 85, No. 1, Sep. 1991, pp. 177–182.

Juskaitis, R., et al., "Differential Confocal Scanning Microscope with a Two-Mode Optical Fiber", *Applied Optics*, vol. 31, No. 7, Mar. 1992, pp. 892–902.

Juskaitis, R., et al., "Imaging in Reciprocal Fibre-Optic Based Confocal Scanning Microscopes", *Optics Communication*, vol. 92, No. 4-6, Sep. 1992, pp. 315–325.

*Primary Examiner*—David C. Nelms
*Attorney, Agent, or Firm*—Shapiro and Shapiro

[57] ABSTRACT

A confocal laser scanning differential interference microscope includes an illumination optical system for radiating a laser light spot onto an object, a focusing optical system for focusing light reflected by the object onto a detection surface, a detection optical system for detecting the reflected light focused on the detection surface, a scanning device for scanning the laser light spot relative to the object, and an optical element arranged between the focusing optical system and the detection optical system, and having a waveguide device for propagating the reflected light focused by the focusing optical system. The waveguide device has waveguides in at least two directions perpendicular to the optical axis of incident light. The waveguides constitute a double-mode transmission waveguide, which selects either of a combination of a 0th-order mode and a 1st-order mode and the 0th-order mode alone in each of the two directions of the reflected light from the object according to amplitude distributions of electric fields in the two directions of the incident light as waveguide modes in the two directions upon propagation of the incident light, and propagates light in the selected modes. The detection optical system receives light emerging from the waveguide, and detects whether the waveguide in each of the two directions is the combination of the 0th-order mode and the 1st-order mode, or the 0th-order mode alone, thereby detecting amplitude distributions of the electric fields, in the two directions, of the reflected light from the object.

10 Claims, 4 Drawing Sheets

CONFOCAL LASER SCANNING MICROSCOPE WITH DUAL MODE WAVEGUIDE

BACKGROUND OF THE INVENTION

1. Field of the Invention

The present invention relates to a confocal laser scanning microscope.

2. Related Background Art

A confocal laser scanning microscope comprises a laser light source, an illumination optical system for forming a light spot by focusing a light beam emitted from the laser light source onto an object, a focusing optical system for focusing the light beam reflected by the object onto a detection surface, a detection means for detecting the light beam focused on the detection surface, and a scanning means for moving the light spot relative to the object. A laser beam is focused on an object, and optical detection is performed on the detection surface via a pinhole aperture. For this reason, the microscope has an advantage of a very small focal depth, and is used in various applications.

An arrangement for obtaining a differential interference image using such a confocal laser scanning microscope can be realized by using an arrangement of a differential interference apparatus in a conventional optical microscope. However, the arrangement becomes complicated, and requires a special objective lens with a small distortion, Nomarski prism, wavelength plate, and the like. For this reason, it is difficult to manufacture the respective optical components with required precision, resulting in an expensive apparatus.

The present inventors proposed a confocal laser scanning differential interference microscope, which can independently obtain phase information and amplitude information of an object in a compact and simple arrangement using a waveguide, in Japanese Patent Application No. 2-400212 (Japanese Laid-Open Patent Application No. 4-208913). More specifically, a laser beam is focused on an object, a double-mode channel waveguide is arranged at a spot image position of the laser spot by the focusing optical system, and a waveguide branch region for branching the waveguide into a plurality of channel waveguides is subsequently arranged. By detecting a difference between light amounts passing through the branched channel waveguides, a microscopic inclination of an object is detected.

However, the arrangement of the above-mentioned proposal can obtain a differential signal of phase information or amplitude information in the widthwise direction of the double-mode waveguide region, but has no detection capacity of a differential signal in a direction perpendicular to the widthwise direction of the double-mode waveguide region. For this reason, information in the direction perpendicular to the widthwise direction of the double-mode waveguide region can be obtained by rotating the microscope apparatus relative to an object. However, a mechanism for rotating the microscope relative to a sample is then additionally required, and a sample cannot be observed simultaneously in the widthwise direction and the direction perpendicular thereto.

SUMMARY OF THE INVENTION

It is an object of the present invention to provide a confocal laser scanning microscope which can obtain a differential image, in a required direction, of an object without requiring relative rotation between the object and the microscope.

According to the present invention, there is provided a confocal laser scanning microscope which includes an illumination optical system for radiating a laser beam spot onto an object, a focusing optical system for focusing light reflected by the object onto a detection surface, detection means for detecting reflected light focused on the detection surface, and scanning means for scanning the laser beam spot relative to the object, comprising:

an optical element arranged between the focusing optical system and the detection means, and having a waveguide for propagating the reflected light focused by the focusing optical system, wherein the waveguide is a double-mode waveguide, which has waveguide structures in at least two directions perpendicular to the optical axis of incident light, and propagates the incident light by selecting each of waveguide modes in the two directions upon propagation of the incident light from a combination of a 0th-order mode and a 1st-order mode, and the 0th-order mode alone in accordance with amplitude distributions of electric fields, in the two directions, of the incident light, and the detection means receives light emerging from the waveguide, and detects which of the combination of the 0th-order mode and the 1st-order mode, or the 0th-order mode alone is selected for each of the waveguide modes in the two directions, thereby detecting amplitude distributions of the electric fields, in the two directions, of the reflected light by the object.

The principle of the present invention is described in detail in the above-mentioned application, and will be briefly described below.

A laser spot reflected by an object forms a spot image again on a detection surface by a focusing optical system including an objective lens, an image formation lens, and the like. At the formation position of the spot image, the entrance port of a double-mode channel waveguide is arranged so that the center of the spot image coincides with that of the entrance port of the double-mode channel waveguide. At this time, if the spot image amplitude distribution in the widthwise direction of the waveguide is an even function when the spot center is defined as an origin, only an even mode is excited in the double-mode waveguide. Otherwise, both the even and odd modes are excited.

A detection element whose light-receiving surface is divided into at least two sections is arranged at the exit port of the double-mode channel waveguide, and detects the spot image emerging from the exit port of the waveguide. The detection element is arranged so that the center of its light-receiving surface coincides with that of the exit port of the waveguide. When the even mode alone is excited in the double-mode waveguide, light components having equal amounts are distributed onto the two light-receiving surface sections; otherwise, since the even and odd modes interfere with each other, the light amounts distributed onto the two light-receiving surface sections are not normally equal to each other.

In general, if an object has an inclination with respect to the entrance port of the double-mode channel waveguide, i.e., a physical inclination, all inclinations, such as a refractive index inclination, which changes an optical path length, and an inclination in a transmittance or reflectance distribution, the amplitude distribution of the spot image has an odd function component. At this time, both the even and odd modes are excited in the double-mode waveguide, and as a result, the light amounts distributed onto the two light-receiving surface sections do not become equal to each other. Therefore, by detecting a difference between the light amounts on the two light-receiving surface sections, a microscopic inclination of the object can be detected.

Assume that the inclination angle of an object to be detected with respect to the entrance port of the double-mode waveguide is represented by $\theta$, which satisfies $\sin\theta = \alpha$. When the spot amplitude distribution at the inclination $\theta$ is represented by $u(x)$, and the intrinsic electric field distributions of the even and odd modes of the double-mode waveguide are respectively represented by $fe(x)$ and $fo(x)$, $u(x)$ and $fe(x)$ are even functions, and $fo(x)$ is an odd function. The spot amplitude distribution $u\alpha(x)$ with the inclination is given by:

$$u\alpha(x) = u(x)\exp(ik\alpha x) = u(x)[\cos(k\alpha x) + i\sin(k\alpha x)] \quad (1)$$

for $$k = 2\pi/\lambda \quad (\lambda = \text{wavelength})$$

An excitation efficiency $\eta_e$ of the even mode is given by:

$$\eta_e = \frac{\int u(x)\cos(k\alpha x)fe^*(x)dx}{\sqrt{\int |u(x)|^2 dx \int |fe(x)|^2 dx}} \quad (2)$$

On the other hand, an excitation efficiency $\eta_o$ of the odd mode is given by:

$$\eta_o = \frac{i\int u(x)\sin(k\alpha x)fo^*(x)dx}{\sqrt{\int |u(x)|^2 dx \int |fo(x)|^2 dx}} \quad (3)$$

When an integration range is properly selected, and $|k\alpha x| < 2\pi$ is satisfied within this range, the following relations are satisfied:

$$\cos(k\alpha x) \simeq 1, \ \sin(k\alpha x) \simeq k\alpha x$$

Therefore, since $u(x)$, $fo(x)$, and $fe(x)$ are fixed functions, it is apparent that:

$$\eta_e \text{ is almost constant, } \eta_o \propto i\alpha \quad (4)$$

A change in light intensity upon interference between the even and odd modes is given by:

$$I \propto |\eta_e \pm i\eta_o \exp\{i\phi\}|^2 = |C_1 \pm i\alpha C_2 \exp\{i\phi\}|^2 \quad (5)$$

where $C_1$ and $C_2$ are real constants, and $\phi$ is the phase difference between the even and odd modes at the exit port of the double-mode waveguide.

Therefore, when $\exp\{i\phi\}$ is assumed, relation (5) is approximated to:

$$I = C_1^2 \pm 2\alpha C_1 C_2 \quad (6)$$

Thus, the change in intensity proportional to $\alpha$ is obtained, and a so-called differential image can be obtained.

Therefore, in order to obtain such a differential image, it is necessary to provide a phase difference corresponding to an odd-number multiple of 90° between the two modes at the exit port of the double-mode waveguide. For this purpose, a length L from the entrance port to the exit port of the double-mode waveguide is preferably set as:

$$L = L_C(2m+1)/2 \ (m = 0, 1, 2, \ldots) \quad (7)$$

where $L_C$ is the known complete coupling length (a length which provides a phase difference of 180° between the even and odd modes) of the two modes.

Since relation (1) considers the inclination of an object, a phase object is assumed in this case. The present invention can be applied not only to the phase object but also to an intensity modulation object (an object in which the transmittance or reflectance changes spatially). Such an object can be expressed by:

$$u\alpha(x) = u(x)(1 + \alpha x) \quad (8)$$

where $\alpha$ is a real number. At this time, it is apparent that:

$$\eta_e \text{ is almost constant, } \eta_o \propto \alpha \quad (9)$$

For this reason, the ratio of light amounts distributed to two branches upon interference of the even and odd modes is maximized when a phase difference corresponding to an integer multiple of 180° is provided between the two modes at the exit port of the double-mode waveguide, i.e., when $\exp\{i\phi\} = \pm 1$ is substituted in relation (5).

Therefore, in order to observe a differential image of the intensity modulation object, the length L from the entrance port to the exit port of the double-mode waveguide is preferably defined by an integer multiple of the coupling length $L_C$, i.e., is given by:

$$L = mL_C \ (m = 1, 2, \ldots) \quad (10)$$

More specifically, a differential image of a phase modulation portion or an intensity modulation portion alone of an object can be observed by appropriately setting the length L from the entrance port to the exit port of the double-mode waveguide.

According to the above-mentioned principle of the differential interference microscope using the channel waveguide, in the present invention, a three-dimensional channel waveguide having a double-mode structure in two directions, i.e., the widthwise direction of the waveguide and a direction perpendicular thereto, and for example, a detector, whose light-receiving surface is divided into four sections, for detecting light which propagates through the three-dimensional channel waveguide are used.

The light-receiving surface of the detector is divided into four sections by two orthogonal axes having, as the origin, a point coinciding with the center of the exit port of the double-mode three-dimensional channel waveguide. The divided light-receiving surface sections have equal light-receiving areas.

By detecting a difference between the light amounts on the four light-receiving surface sections by processing signals from the four light-receiving surface sections, differential information in the orthogonal directions can be obtained. By synthesizing signals detected in correspondence with the two orthogonal axes, a differential image as a contrast difference in an arbitrary direction can be obtained.

More specifically, when a signal in the widthwise direction of the waveguide is represented by $I_1$, and a signal in the direction perpendicular to the widthwise direction of the waveguide is represented by $I_2$, signal processing is performed as follows:

$$I = I_1 \sin\theta + I_2 \cos\theta$$

When $\theta$ is changed within a range from 0 to $\pi$, a direction to obtain a differential image of an object can be changed, and a differential image having a contrast in a required direction can be obtained without rotating the microscope relative to a sample. In a practical application, it is preferable that the value $\theta$ is properly changed while observing a monitor screen as the confocal laser scanning microscope so as to select a value $\theta$, which can most adequately express a differential image of an object.

DESCRIPTION OF THE PREFERRED EMBODIMENTS

The preferred embodiments of the present invention will be described below with reference to the accompanying drawings.

(First Embodiment)

Figure 1:
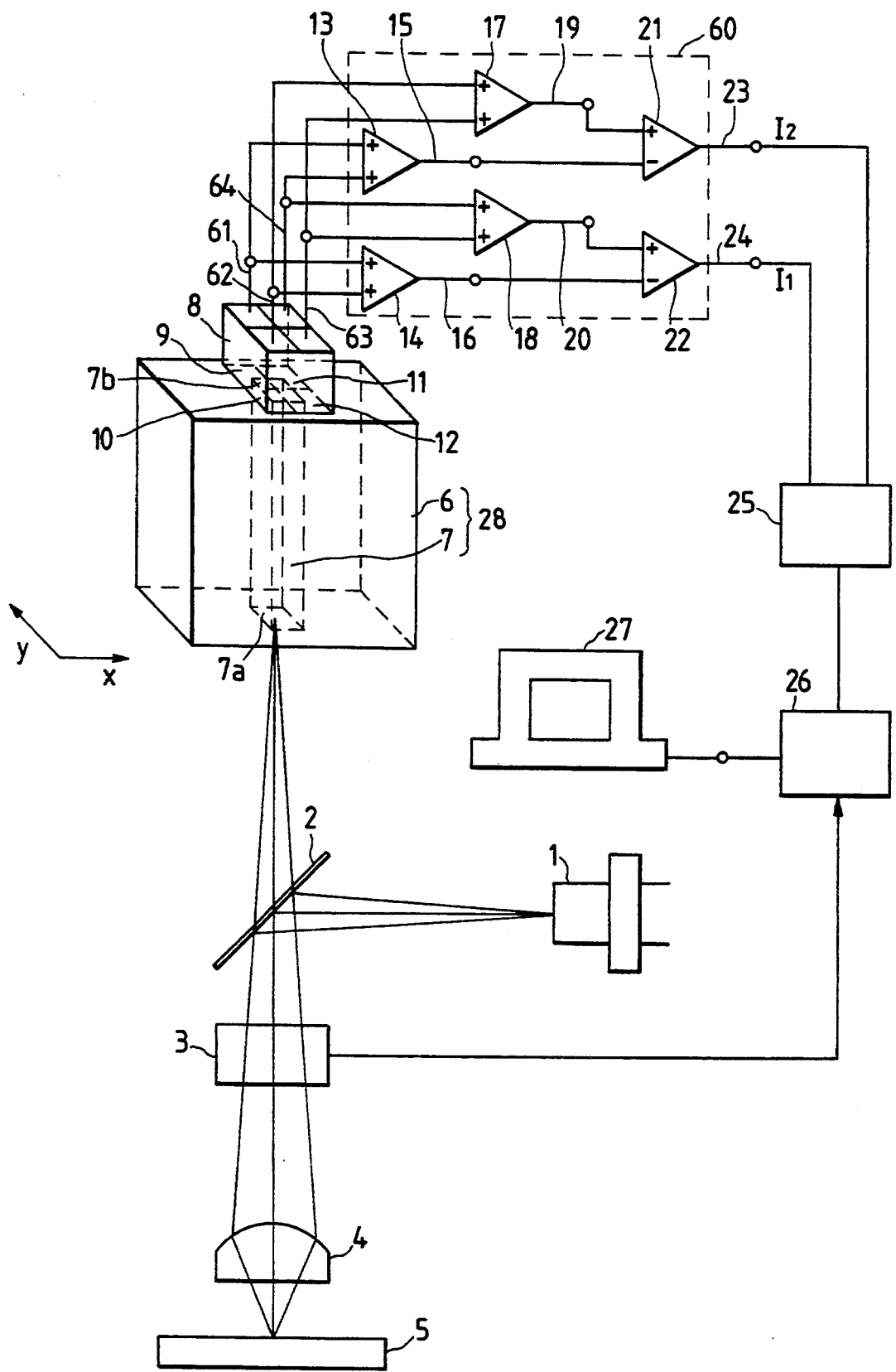
FIG. 1 is a diagram showing an arrangement of a confocal laser scanning differential interference microscope according to the first embodiment of the present invention.
Figure 4:
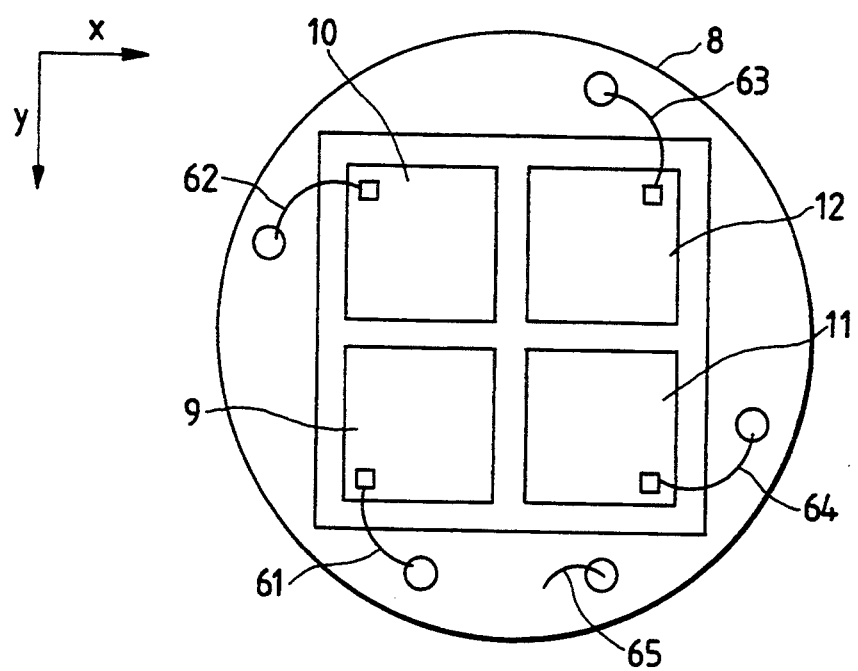
FIG. 4 is a bottom view showing four-divided light-receiving surfaces of a photodetector.

FIG. 1 shows a confocal laser scanning differential interference microscope according to the first embodiment of the present invention. As shown in FIG. 1, the confocal laser scanning differential interference microscope of this embodiment comprises an illumination optical system in which a semiconductor laser light source 1, a half mirror 2 for deflecting light emitted from the semiconductor laser light source 1, and an objective lens 4 for focusing light onto an object 5 are arranged in turn along the optical axis. A known X-Y two-dimensional scanner 3 for scanning light on the object 5 is arranged between the half mirror 2 and the objective lens 4. The confocal laser scanning differential interference microscope of this embodiment also comprises a three-dimensional channel waveguide 28, and a photodetector 8 comprising a silicon photodiode whose light-receiving surface is divided into four sections. The objective lens 4 also serves as a focusing optical system for focusing light reflected by the object 5. The three-dimensional channel waveguide 28 and the photodetector 8 constitute an optical system for detecting light reflected by the object 5. The light-receiving surface of the photodetector 8 consists of four square light-receiving surfaces 9, 10, 11, and 12 having equal areas, as shown in FIG. 4. The four light-receiving surfaces 9, 10, 11, and 12 are arranged in a checkerboard pattern along the x- and y-axes. The photodetector 8 is joined to an exit port 7b of the three-dimensional channel waveguide, so that the center of the light-receiving surface coincides with that of the exit port 7b.

Signal lines 61, 62, 63, and 64 for outputting detected light amounts as electrical signals to a signal processing circuit 60, and a ground line 65 are connected to the light-receiving surfaces 9, 10, 11, and 12 of the photodetector 8. The signal processing circuit 60 for processing these signals comprises a sum detector 13 for adding output signals from the neighboring light-receiving surfaces 9 and 11 along the x-axis, and a sum detector 17 for adding output signals from the neighboring light-receiving surfaces 10 and 12 along the x-axis. The circuit 60 further comprises a sum detector 14 for adding output signals from the neighboring light-receiving surfaces 9 and 10 along the y-axis, and a sum detector 18 for adding output signals from the neighboring light-receiving surfaces 11 and 12 along the y-axis. A differential detector 21 detects a differential signal $I_2$ between the output signals from the sum detectors 13 and 17, thereby obtaining a light amount difference in the y-direction. A differential detector 22 detects a differential signal $I_1$ between the output signals from the sum detectors 14 and 18, thereby obtaining a light amount difference in the x-direction. A signal synthesizing circuit 25 synthesizes a differential signal $I(\phi)$ in a $\phi$ direction according the following equation using the differential signals $I_1$ and $I_2$ in the x- and y-directions, and an angle $\phi$ instructed by a user so as to provide a differential image of the object in a direction to be observed by a user:

$$I(\phi) = I_1 \sin\phi + I_2 \cos\phi \tag{11}$$

A controller 26 receives a signal indicating the position of a light beam on the object from the X-Y two-dimensional scanner 3, and stores this position signal and the differential signal $I(\phi)$ in correspondence with each other to convert them into image data. A monitor 27 receives image data from the controller, and displays an image.

The three-dimensional channel waveguide 28 will be described in detail below. The three-dimensional channel waveguide 28 comprises a double-mode three-dimensional channel waveguide constituted by a core portion 7 which consists of $SiO_xN_y$ having a refractive index of 1.475, and has a width (x-direction in FIG. 1) of 3 μm and a depth (y-direction in FIG. 1) of 3 μm, and a cladding portion 6 consisting of $SiO_2$ having a refractive index of 1.465. When the mode of the waveguide 28 is represented by $E_{pq}$ (where p is the mode order in the x-direction of the waveguide 28, and q is the mode order in the y-direction), the waveguide is arranged to propagate light in only $E_{00}$, $E_{10}$, and $E_{01}$ modes as waveguide modes, and not to propagate light in an $E_{11}$ mode.

A length L from an entrance port 7a to the exit port 7b of the core portion 7 of the waveguide 28 is set to satisfy the following relations in the case of a confocal laser scanning differential interference microscope for observing the phase distribution of an object:

$$L \approx L_{C1}(2m+1)/2 \text{ and } L \approx L_{C2}(2n+1)/2$$

for (m=0, 1, 2, ...) and (n=0, 1, 2, ...) where $L_{C1}$ is the complete coupling length in the $E_{00}$–$E_{10}$ mode, and $L_{C2}$ is the complete coupling length in the $E_{00}$–$E_{01}$ mode.

Also, in the case of a confocal laser scanning differential interference microscope for observing the intensity distribution of an object, the length L is set to satisfy:

$$L \simeq mL_{C1} \text{ and } L \simeq nL_{C2}$$

for (m=1, 2, ...) and (n=1, 2, ...)

A method of manufacturing the three-dimensional channel waveguide 28 will be described below. An $SiO_xN_y$ film having a refractive index of 1.475, which film serves as the core portion 7, is formed on an $SiO_2$ substrate having a refractive index of 1.465, which substrate serves as the cladding portion 6, by RF sputtering, and thereafter, the $SiO_xN_y$ film is patterned into a core shape by lithography. By adjusting the oxygen and nitrogen amounts supplied during the RF sputtering, x and y of the $SiO_xN_y$ film are adjusted to obtain an arbitrary refractive index. Then, an $SiO_2$ film is formed by RF sputtering to cover the $SiO_xN_y$ film having the core shape. In this manner, the core portion 7 consisting of $SiO_xN_y$ and the cladding portion 6 consisting of $SiO_2$ are formed. Finally, the resultant structure is cut to have the above-mentioned length L, and the cut piece is finished by polishing its entrance and exit ports.

The operation of the confocal laser scanning differential interference microscope of this embodiment will be described below.

In FIG. 1, light emitted from the semiconductor laser light source 1 is reflected by the half mirror 2, becomes incident on the objective lens 4 via the known X-Y two-dimensional scanner 3, and is focused onto the object 5. The light reflected by the surface of the object 5 is transmitted through the half mirror 2 via the objective lens 4 and the X-Y two-dimensional scanner 3 again, and is focused on the entrance port 7a of the core portion 7 of the three-dimensional channel waveguide 28. The three-dimensional channel waveguide 28 is a waveguide having double modes in the widthwise direction (x-direction) and a direction (y-direction) perpendicular thereto. Light which propagates through the core portion 7 of the three-dimensional channel waveguide 28 emerges from the exit port 7b, and reaches the photodetector 8 which is joined to the core portion 7, and has the four-divided light-receiving surfaces. The photodetector 8 is joined to the core portion 7 so that the center of the four-divided light-receiving surfaces coincides with that of the three-dimensional channel waveguide 28. Since the entrance port 7a of the three-dimensional channel waveguide 28 has the same function as that of a pinhole, this arrangement constitutes a confocal laser scanning microscope.

Figure 3A:
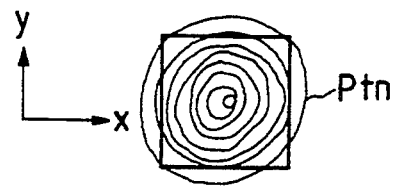
FIGS. 3A to 3D are views showing waveguide light patterns which propagate through a double-mode three-dimensional channel waveguide.
Figure 3B:
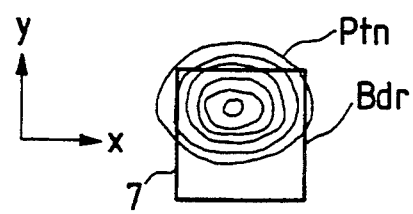
Figure 3C:
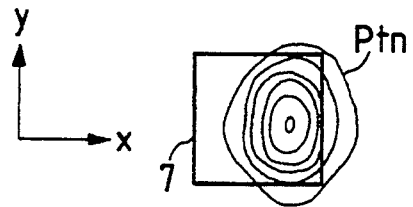

Assuming that the mode of the waveguide is represented by $E_{pq}$ (where p is the mode order in the widthwise direction of the waveguide, and q is the mode order in the direction perpendicular to the widthwise direction of the waveguide), when a point on the object 5 irradiated with the laser spot has an inclination or a reflectance gradient in the widthwise direction (x-direction) of the waveguide, both the $E_{00}$ and $E_{10}$ modes are excited in the core portion 7 of the three-dimensional channel waveguide 28, as described above. FIG. 3C shows a waveguide light pattern Ptn obtained in this case. In FIGS. 3A to 3D, a plurality of concentric circles in a waveguide light pattern Ptn are equal light intensity curves representing the intensity distribution of the waveguide light pattern Ptn. In each of the waveguide light patterns Ptn shown in FIGS. 3A to 3D, the light intensity at the central portion is strongest, and is weakened toward an outer peripheral portion. When both the $E_{00}$ and $E_{10}$ modes are excited, since the waveguide light pattern Ptn shown in FIG. 3C is obtained due to interference between the two modes, the magnitude of a sum signal 16 obtained from the sum detector 14 for adding the outputs from the light-receiving surfaces 9 and 10 of the photodetector 8 is not equal to the magnitude of a sum signal 20 obtained from the sum detector 18 for adding the outputs from the light-receiving surfaces 11 and 12. Therefore, when the differential detector 22 detects a differential signal 24 between the sum signal 16 of the outputs from the light-receiving surfaces 9 and 10 of the photodetector 8 and the sum signal 20 of the outputs from the light-receiving surfaces 11 and 12, a small step or reflectance difference, in the widthwise direction (x-direction) of the waveguide, on the object surface can be detected. At this time, the differential detector 21 outputs no signal.

Similarly, when a point on the object 5 irradiated with the laser spot has an inclination or a reflectance gradient in the direction (y-direction) perpendicular to the widthwise direction of the waveguide, both the $E_{00}$ and $E_{01}$ modes are excited in the core portion 7 of the double-mode waveguide 28. FIG. 3B shows the waveguide light pattern Ptn at this time. Due to interference between the two modes, the magnitude of a signal 15 obtained from the sum detector 13 for adding the outputs from the light-receiving surfaces 9 and 11 of the photodetector 8 is not equal to the magnitude of a signal 19 obtained from the sum detector 17 for adding the outputs from the light-receiving surfaces 10 and 12. Therefore, when the differential detector 21 detects a differential signal 23 between the sum signal 15 of the outputs from the light-receiving surfaces 9 and 11 of the photodetector 8 and the sum signal 19 of the outputs from the light-receiving surfaces 10 and 12, a small step or reflectance difference, in the direction (y-direction) perpendicular to the widthwise direction of the waveguide, on the object surface can be detected. At this time, the differential detector 22 outputs no signal. Note that Bdr in FIG. 3B represents a boundary between the core and the cladding.

Similarly, when neither an inclination nor a reflectance gradient are present on the surface of the object 5 irradiated with the laser spot, only the $E_{00}$ mode is excited. FIG. 3A shows the waveguide light pattern Ptn at this time. The magnitude of the signal 15 obtained from the sum detector 13, the magnitude of the signal 19 obtained from the sum detector 17, the magnitude of the signal 16 obtained from the sum detector 14, and the magnitude of the signal 20 obtained from the sum detector 18 are equal to each other, and it is detected that neither an inclination nor a reflectance gradient are present.

Figure 3D:
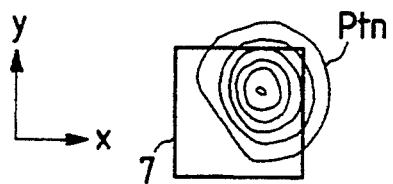

Furthermore, when inclinations or reflectance gradients are present on the surface of the object 5 irradiated with the laser spot in both the x- and y-directions, the $E_{00}$, $E_{01}$, and $E_{10}$ modes are excited. FIG. 3D shows the waveguide light pattern Ptn at this time. At this time, since the light-receiving surfaces 9, 10, 11, and 12 have different light-receiving intensities due to interference among these modes, both the differential detectors 21 and 22 output the differential signals 23 and 24, thereby detecting the inclinations or reflectance gradients in the x- and y-directions.

When the differential signals 23 and 24 are respectively represented by $I_1$ and $I_2$, the signal synthesizing circuit executes processing, given by the following equation, of these signals while setting $\phi$ to be a proper value within a range from 0 to $\pi$ designated by a user:

$$I(\phi) = I_1 \sin\phi + I_2 \cos\phi$$

Then, the controller 26 stores the obtained signal in correspondence with the light beam position on the object obtained from the X-Y two-dimensional scanner 3 to convert them into image data, and the monitor 27 can display a differential interference image having a contrast in a required direction.

(Second Embodiment)

Figure 2:
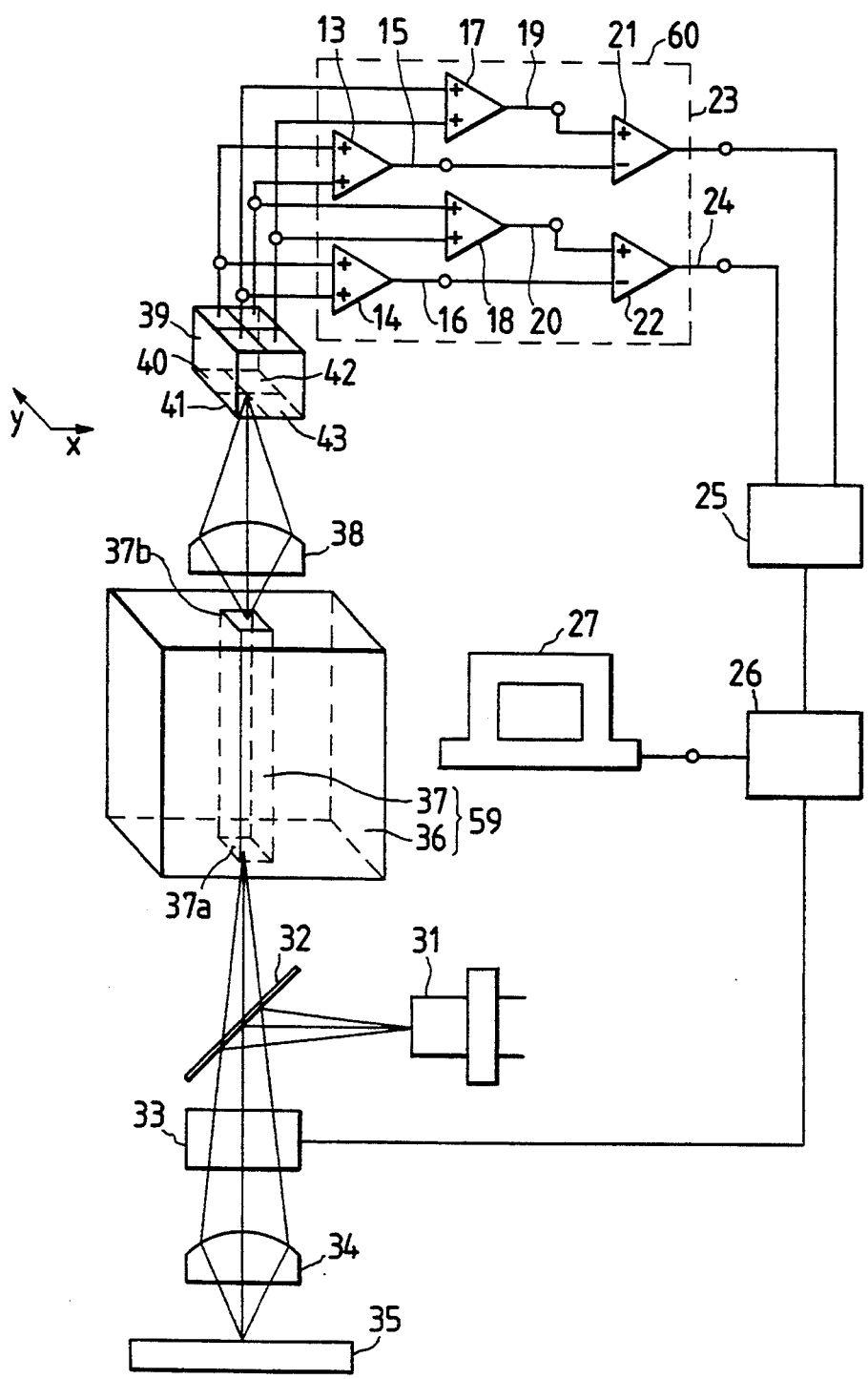
FIG. 2 is a diagram showing an arrangement of a confocal laser scanning differential interference microscope according to the second embodiment of the present invention.

FIG. 2 shows a confocal laser scanning differential interference microscope according to the second embodiment of the present invention. In the confocal laser scanning differential interference microscope of this embodiment, a photodetector 39 is not directly joined to an exit port 37b of a waveguide 59, but is coupled thereto via an objective lens 38. A semiconductor laser light source 31, a half mirror 32, an X-Y two-dimensional scanner 33, and an objective lens 34 for focusing light onto an object 35 are arranged in turn along the optical axis, thus constituting an illumination optical system. Also, the three-dimensional channel waveguide 59, the objective lens 38 for focusing light emerging from the three-dimensional channel waveguide 59, and the photodetector 39 arranged at a focal point, and comprising a silicon photodiode having four-divided light-receiving surfaces constitute an optical system for detecting light reflected by the object 35. The objective lens 34 also serves as a focusing optical system for focusing light reflected by the objective lens 35. The light-receiving surface of the photodetector 39 comprises four square light-receiving surfaces 40, 41, 42, and 43, which are arranged in a checkerboard pattern along the x- and y-axes, and have equal areas, like in the first embodiment. The objective lens 38 is arranged to focus light emerging from the exit port 37b of the waveguide 59 onto the center of the light-receiving surfaces 40, 41, 42, and 43.

Since the arrangements of a signal processing circuit 60, a signal synthesizing circuit 25, a controller 26, and a monitor 27 are the same as those in the first embodiment, a detailed description thereof will be omitted.

The three-dimensional channel waveguide 59 will be described in detail below. The three-dimensional channel waveguide 59 comprises a double-mode three-dimensional channel waveguide constituted by a core portion 37 which consists of Ti-diffused LiNbO$_3$, and a cladding portion 36 consisting of LiNbO$_3$. When the mode of the waveguide 59 is represented by $E_{pq}$ (where p is the mode order in the x-direction of the waveguide 59, and q is the mode order in the y-direction), the waveguide is arranged to propagate light in only $E_{00}$, $E_{10}$, and $E_{01}$ modes as waveguide modes, and not to propagate light in an $E_{11}$ mode.

A length L from an entrance port 37a to the exit port 37b of the core portion 7 of the waveguide 59 is set to satisfy the following relations in the case of a confocal laser scanning differential interference microscope for observing the phase distribution of an object:

$$L \approx L_{C1}(2m+1)/2 \text{ and } L \approx L_{C2}(2n+1)/2$$

for (m=0, 1, 2, ...) and (n=0, 1, 2, ...) where $L_{C1}$ is the complete coupling length in the $E_{00}$-$E_{10}$ mode, and $L_{C2}$ is the complete coupling length in the $E_{00}$-$E_{01}$ mode.

Also, in the case of a confocal laser scanning differential interference microscope for observing the intensity distribution of an object, the length L is set to satisfy:

$$L \approx mL_{C1} \text{ and } L \approx nL_{C2}$$

for (m=1, 2, ...) and (n=1, 2, ...)

A method of manufacturing the three-dimensional channel waveguide 59 will be described below. A Ti film is formed on an LiNbO$_3$ substrate serving as the cladding portion by RF sputtering, and is then patterned by lithography to have the same width as that of the core portion 37. Then, the LiNbO$_3$ substrate formed with the Ti film is heated to diffuse Ti into the LiNbO$_3$ substrate, thereby forming the core portion 37. By adjusting the heating temperature and time, the diffusion depth can be adjusted to form the core portion 37 having an arbitrary size in the y-direction. The resultant structure is then subjected to lithography and etching so as to define a size, in the x-direction, of the core portion 37. An LiNbO$_3$ film is formed by RF sputtering on the Ti-diffused LiNbO$_3$ substrate, which is formed into a core shape so as to cover the Ti-diffused LiNbO$_3$ substrate. In this manner, the core portion 37 consisting of Ti-diffused LiNbO$_3$ and the cladding portion 36 consisting of LiNbO$_3$ are formed. Finally, the resultant structure is cut into a piece having the above-mentioned length L, and the cut piece is finished by polishing its entrance and exit ports.

The operation of the confocal laser scanning differential interference microscope of this embodiment will be described below.

Light emitted from the laser light source 31 is incident on the objective lens 34 via the X-Y two-dimensional scanner 33, and is focused onto the object 35. The light reflected by the object 35 is transmitted through the objective lens 34 and the X-Y two-dimensional scanner 33 again. Then, the light is transmitted through the core portion 37 formed on the cladding portion 36, and is focused by the objective lens 38 onto the photodetector 39 having the four-divided light-receiving surfaces. The photodetector 39 is arranged, so that the center of the four-divided light-receiving surfaces coincides with that of a light spot image. The subsequent operations are the same as those in the first embodiment. That is, the ratio of powers distributed to the four light-receiving surfaces 40, 41, 42, and 43 changes according to an inclination of the object surface. The photodetector 39 detects light amounts in units of light-receiving surfaces. Sum detectors 13, 14, 17, and 18 output sum signals 15, 16, 19, and 20, and differential detectors 21 and 22 detect differential signals 23 and 24, thus obtaining differential interference signals. When the differential signals 23 and 24 are properly processed like in the first embodiment, a differential interference image having a contrast in a required direction can be obtained.

In this manner, since each of the first and second embodiments of the present invention adopts the double-mode three-dimensional channel waveguide, inclination data or reflectance gradient data of an object to be detected in the widthwise direction (x-direction) and the depth direction (y-direction) of the waveguide can be simultaneously obtained. Therefore, by synthesizing these data in the x- and y-directions, the inclination or reflectance gradient data of the object in an arbitrary direction to be seen by a user can be obtained. Thus, data of the object in x- and y-directions can be fetched in a single operation without requiring any mechanism for rotating the object, and the inclination or reflectance gradient, in an arbitrary direction, of the object can be observed in the same manner as in a case wherein the object is rotated.

In each of the first and second embodiments, the three-dimensional channel waveguide is used. However, the present invention is not limited to a channel type waveguide, but a fiber type waveguide may be used.

Since the three-dimensional channel waveguide 59 of the second embodiment has an electrooptical effect, an electrode for applying a voltage to the core portion 37 may be arranged near the core portion 37, and a voltage to be applied to the electrode may be changed to change the complete coupling length $L_C$. Then, the phase and intensity distributions of an object can be independently detected by a single waveguide device.

In each of the above embodiments, the laser light source and the photodetector are externally arranged with respect to the waveguide. However, when a silicon substrate is used, the photodetector and the waveguide can be arranged on a single substrate. When a compound semiconductor substrate such as gallium arsenide is used, both the laser light source and the photodetector can be monolithically integrated on a single substrate common to the waveguide, and a further compact, lightweight structure of the apparatus and saving of adjustment can be attained. When it is difficult to integrally arrange the laser light source or the photodetector with the waveguide, they may be separately arranged, and light may be guided via an optical fiber or a lens system.

In each of the above embodiments, other examples of the materials suitable for forming the channel waveguide will be described below. As the cladding substrate of the waveguide, for example, soda glass, pyrex, or molten quartz crystal may be used. As the substrate, $LiNbO_3$, $LiTaO_3$, GaAs, or InP may be used. When an electrode is formed based on an electrooptical effect of these materials, the complete coupling length $L_C$ of the double-mode waveguide region can be changed. Furthermore, GaAs and InP allow to monolithically integrate a laser diode or a detection element with the waveguide. When the substrate consists of Si, a light-receiving element can be integrally formed. Examples of the materials for the substrate and the waveguide layer for forming the channel waveguide used in the present invention including the above-mentioned materials can be summarized, as shown in Table 1 below, and it is preferable to select proper materials according to the different features of the materials.

TABLE 1

| | Waveguide Structure | |
|---|---|---|
| | Cladding | Core |
| Materials allowing formation of electrode | $LiNbO_3$ | Ti-diffused $LiNbO_3$ Proton-exchanged $LiNbO_3$ ($H_xLi_{1-x}NbO_3$) |
| | $LiTaO_3$ | Nb-diffused $LiTaO_3$ Cu-diffused $LiTaO_3$ $LiNbO_3$ |
| | $Al_2O_3$ | PLZT |

TABLE 1-continued

| | Waveguide Structure | |
|---|---|---|
| | Cladding | Core |
| Materials allowing integration of photodetector | $SiO_2$/Si | Barium borosilicate glass $Si_3N_4$ ZnO $Nb_2O_5$ $Ta_2O_5$ $(SiO_2)_x$—$TaO_{2y}$ |
| Materials allowing formation of electrode, and integration of LD and photodetector | GaAs InP | $Ga_{1-x}Al_xAs$ $In_xGa_{1-x}AsP_y$ |
| Materials allowing neither formation of electrode nor integration of LD and light-receiving element | Soda glass | Ion-exchanged glass Polyurethane Epoxy Photoresist |
| | Pyrex Molten quartz crystal | Barium borosilicate glass PMMA Photopolymer |

In each of the first and second embodiments, the sum signals of outputs from the neighboring ones of the four light-receiving surfaces of the photodetector are calculated, and thereafter, a difference between the sum signals is calculated. However, since the waveguide light patterns shown in FIGS. 3A to 3D need only be discriminated from each other, the sum detectors for the four light-receiving surfaces may be omitted, and the signals from the four light-receiving surfaces may be differentiated.

In the present invention, differential information of an object can be detected based on a difference signal of sum signals of output signals from two proper pairs of light-receiving surfaces of the photodetector having the four-divided light-receiving surfaces. When sum signals are calculated in place of the difference signal, the arrangement of the present invention serves as a normal confocal laser scanning microscope, as a matter of course.

In each of the above embodiments, the objective lens is commonly used in both the illumination optical system and the focusing optical system to constitute a so-called reflection illumination type microscope. In the present invention, an illumination optical system may be arranged on one side of an object, and a focusing optical system may be arranged on the other side of the object so as to constitute a so-called transmission type microscope.

When a signal obtained by processing the two differential signals from the photodetector is properly processed, images having various contrasts can be obtained, as a matter of course.

In each of the above embodiments, the differential signals obtained from the two differential detectors are processed. When the two differential signals are displayed on different monitors without executing the signal processing, differential images in a certain direction of an object and in a direction perpendicular thereto can be simultaneously and separately observed.

In each of the above embodiments, as a means for moving a light spot relative to an object, the light spot is scanned on the object by the X-Y two-dimensional scanner such as a vibration mirror, a rotary mirror, or the like. Conversely, the light spot may be fixed in position, and a stage for placing an object thereon may be scanned. When the light spot is scanned by vibrating a light beam in an optical system by the vibration mirror, rotary mirror, or the like, the conjugate relationship between the light spot on the object and the light spot focused on the light-receiving surface (the facet of the double-mode waveguide region) of detection means cannot often be strictly maintained due to the influence of the residual aberrations of the optical system. In this case, stage scanning is preferable.

As described above, according to the present invention, in a confocal laser scanning differential interference microscope using a waveguide, a differential image having a contrast in a required direction can be obtained without rotating an object with respect to the optical axis.

What is claimed is:

1. A confocal laser scanning differential interference microscope comprising:
   an illumination optical system for radiating a laser light spot onto an object;
   a focusing optical system for focusing light reflected by the object onto a detection surface;
   a detection optical system for detecting the reflected light focused on the detection surface;
   scanning means for scanning the laser light spot relative to the object; and
   an optical element arranged between said focusing optical system and said detection optical system, and having waveguide means for propagating the reflected light focused by said focusing optical system,
   wherein said waveguide means has waveguides in at least two directions perpendicular to an optical axis of incident light,
   said waveguides constitute a double-mode transmission waveguide, which selects either of a combination of a 0th-order mode and a 1st-order mode and the 0th-order mode alone in each of the two directions of the reflected light from the object according to amplitude distributions of electric fields in the two directions of the incident light as waveguide modes in the two directions upon propagation of the incident light, and propagates light in the selected modes, and
   said detection optical system receives light emerging from said waveguide, and detects whether the waveguide in each of the two directions is the combination of the 0th-order mode and the 1st-order mode, or the 0th-order mode alone, thereby detecting amplitude distributions of the electric fields, in the two directions, of the reflected light from the object.

2. A microscope according to claim 1, wherein said waveguide has an entrance port and an exit port, propagates light in the 0th-order mode when the amplitude distribution of the electric field in each of the two directions of the incident light is an even function having a center of said entrance port as an origin, and propagates light in the 0th-order mode and the 1st-order mode when the amplitude distribution of the electric field is an odd function having the center of said entrance port as an origin.

3. A microscope according to claim 1, wherein said detection optical system comprises light-receiving means for receiving light emerging from said waveguide and converting the received light into an electrical signal, and a circuit for processing the electrical signal converted by said light-receiving means,
   said light-receiving means has four light-receiving surfaces obtained by dividing an entire light-receiving surface into two surfaces in each of the two directions to have a point corresponding to a center of an exit port as an origin, and
   said circuit for processing the electrical signal compares output signals from two neighboring light-receiving surfaces along the two directions of said four light-receiving surfaces to detect whether the waveguide mode in each of the two directions is the combination of the 0th-order mode and the 1st-order mode or the 0th-order mode alone, thereby detecting the amplitude distribution of the electric field of the reflected light from the object.

4. A microscope according to claim 1, wherein said waveguide means comprises a three-dimensional channel waveguide having waveguides in the two directions.

5. A microscope according to claim 4, wherein when the waveguide mode of propagating light is represented by $E_{pq}$ (where p is the mode order of the waveguide in one of the two directions, and q is the mode order of the waveguide in the other direction), said three-channel waveguide can propagate light in only $E_{00}$, $E_{01}$, and $E_{10}$ modes, and cannot propagate light in an $E_{11}$ mode.

6. A microscope according to claim 1, wherein when a length from an entrance port to an exit port of said waveguide is represented by L, a complete coupling length in which a phase difference between $E_{00}$ and $E_{01}$ modes is 180 degrees, is represented by $L_{C1}$, and a complete coupling length in which a phase difference between $E_{00}$ and $E_{10}$ modes is 180 degrees, is represented by $L_{C2}$, the length satisfies:

$$L \simeq mL_{C1} \text{ and } L \simeq nL_{C2} \ (m, n = 1, 2, \ldots)$$

or $$L \simeq L_{C1}(2m+1)/2 \text{ and } L \simeq L_{C2}(2n+1)/2$$

$(m, n = 0, 1, 2, \ldots)$

7. An optical information detecting apparatus for detecting an information of light rays converged to a detecting surface, comprising:
   a base plate formed with a channel waveguide, said channel waveguide having an incident end surface on a predetermined detecting surface, and being a three-dimensional channel waveguide having channel waveguides extending along at least two directions which are perpendicular to an axis of the incident ray directing to the incident surface, said channel waveguide which can respectively select either one of 0th-order mode and 1st-order mode at each direction as waveguide modes for said at least two directions on propagating the incident light rays to energize, in accordance with amplitude distributions of electric fields of the incident light rays in said at least two directions, said channel waveguide having a predetermined length for propagating with the energized mode; and
   detecting means for detecting said light rays propagated in said channel waveguides so as to detecting light distributions along said at least two directions of the channel waveguides, said light distributions being formed by an interference between the 0th-order mode and the 1st-order mode along said at least two directions in said channel waveguides.

8. An optical information detecting apparatus according to claim 7, wherein said detecting means includes light detecting means for detecting a light ray passing through said channel waveguide, and signal processing means for processing an output from said light detecting means.

9. An optical information detecting apparatus according to claim 8, wherein the waveguide mode of propagating light is represented by $E_{pq}$ (where p is the mode order of the waveguide in one of the two directions, and q is the mode order of the waveguide in the other direction), said three dimensional channel waveguide can propagate light in only $E_{00}$, $E_{01}$ and $E_{10}$ modes, and can not propagate light in an $E_{11}$ mode.

10. An optical information detecting apparatus according to claim 9, wherein when a length from an entrance port to an exit port of said waveguide is represented by L, a complete coupling length in which a phase difference between $E_{00}$ and $E_{01}$ modes is 180 degrees, is represented by $L_{C1}$, and a complete coupling length in which a phase difference between $E_{00}$ and $E_{10}$ modes is 180 degrees, is represented by $L_{C2}$, the length satisfies:

$$L \simeq mL_{C1} \text{ and } L \simeq nL_{C2} \ (m,n=1, 2, \ldots)$$

or $$L \simeq L_{C1}(2m+1)/2 \text{ and } L \simeq L_{C2}(2n+1)/2$$

$(m,n=0, 1, 2, \ldots)$.

* * * * *